United States Patent [19]

Ferziger et al.

[11] Patent Number: 4,801,493

[45] Date of Patent: * Jan. 31, 1989

[54] COATED FABRIC AND MATTRESS TICKING

[75] Inventors: Daniel Ferziger, 4515 Greystone Ave., Riverdale, N.Y. 10471; Jerry Lippman, North Bergen, N.J.

[73] Assignee: Daniel Ferziger, Riverdale, N.Y.

[*] Notice: The portion of the term of this patent subsequent to Jul. 2, 2002 has been disclaimed.

[21] Appl. No.: 32,942

[22] Filed: Mar. 30, 1987

Related U.S. Application Data

[63] Continuation of Ser. No. 646,132, Aug. 29, 1984, abandoned, which is a continuation of Ser. No. 556,348, Nov. 30, 1983, abandoned, which is a continuation of Ser. No. 289,893, Aug. 4, 1981, abandoned, which is a continuation-in-part of Ser. No. 171,327, Jul. 20, 1980, Pat. No. 4,526,830.

[51] Int. Cl.$^4$ .............................................. B32B 7/00
[52] U.S. Cl. ................................ 428/268; 5/459; 5/483; 428/442; 428/913; 428/920
[58] Field of Search ................ 5/459, 483; 428/268, 428/913, 920, 442

[56] References Cited

U.S. PATENT DOCUMENTS

| | | | |
|---|---|---|---|
| Re. 24,591 | 1/1959 | Schwartz | 5/354 |
| 2,272,397 | 2/1942 | Becher et al. | 260/768 |
| 2,381,542 | 8/1945 | Hyatt et al. | 154/46 |
| 2,428,591 | 10/1947 | Slayter | 154/44 |
| 2,455,802 | 12/1948 | Pfeffer | 117/126 |
| 2,537,652 | 1/1951 | Churchill | 5/354 |
| 2,632,187 | 3/1953 | Woofendale | 5/354 |
| 2,650,184 | 8/1953 | Biefeld | 428/268 |
| 2,720,269 | 10/1955 | Diacos | 169/1 |
| 2,726,977 | 12/1955 | See et al. | 154/44 |
| 2,801,427 | 8/1957 | Crocker | 5/354 |
| 2,919,200 | 12/1959 | Dubin et al. | 106/15 |
| 2,956,917 | 10/1960 | Fasano | 154/128 |
| 3,279,986 | 10/1966 | Hyman | 167/42 |
| 3,308,488 | 3/1967 | Schoonman | 5/135 |
| 3,436,771 | 4/1969 | Fisher | 5/334 |
| 3,666,522 | 5/1972 | George | 117/33 |
| 3,668,041 | 6/1972 | Lonning | 156/309 |
| 3,691,570 | 9/1972 | Gaines et al. | |
| 3,709,721 | 1/1973 | King | 117/104 R |
| 3,723,139 | 3/1973 | Larkin et al. | 260/45.75 R |
| 3,862,291 | 1/1975 | Brandon, Jr. et al. | 264/321 |
| 3,864,156 | 2/1975 | Weil | 117/136 |
| 3,864,468 | 2/1975 | Hyman et al. | 424/16 |
| 3,883,463 | 5/1975 | Jin et al. | 260/29.4 |
| 3,934,066 | 1/1976 | Murch | 428/248 |
| 3,968,284 | 7/1976 | George | 428/90 |
| 3,968,297 | 7/1976 | Sauer | 428/268 |
| 4,097,630 | 6/1978 | Schwartz et al. | 428/97 |
| 4,174,418 | 11/1979 | Welch et al. | 428/264 |
| 4,254,177 | 3/1981 | Fulmer | 428/256 |
| 4,265,962 | 5/1981 | May | 428/267 |
| 4,504,991 | 3/1985 | Klancnik | 418/71 |
| 4,526,830 | 7/1985 | Ferziger et al. | 428/913 |
| 4,677,016 | 6/1987 | Ferziger et al. | 428/268 |
| 4,690,859 | 9/1987 | Porter et al. | 428/268 |

FOREIGN PATENT DOCUMENTS

| | | |
|---|---|---|
| 207566 | 10/1976 | Argentina . |
| 476279 | 8/1951 | Canada . |
| 1563211 | 3/1969 | France . |
| 867746 | 5/1961 | United Kingdom . |

OTHER PUBLICATIONS

Contract, Specifier Must Assess Fabric Flammability Muddle in Terms of Client Needs (Dec. 1973).
American Textiles Reporter/Bulletin, New-Flameproof, Nontoxic Home Furnishings (Sep. 1973).
Fibercoat; The New Miracle Fabric, Fibercoat Fire Resistant Wall-Fabrics (a colorscope sample).
Encyclopedia of Chem. Technology, pp. 472-473, 25 and 407.
H. S. Katz, The Handbook of Fillers and Reinforcements for Plastics, 1978, p. 237.

*Primary Examiner*—James J. Bell
*Attorney, Agent, or Firm*—Kenyon & Kenyon

[57] ABSTRACT

This invention relates to coated fiberglass fabrics especially suitable for use as mattress tickings. The fabrics comprise a woven or non-woven fiberglass fabric to which a layer of a polymeric coating composition has been applied. The coating comprises a polymeric carrier containing an effective amount of a fungicide and/or bacteriocide, an effective amount of a flame retardant, and a filler which also functions to enhance the flame retardant properties of the fabric.

20 Claims, No Drawings

COATED FABRIC AND MATTRESS TICKING

This application is a continuation of application Ser. No. 646,132, filed Aug. 29, 1984, abandoned, which is a continuation of application Ser. No. 556,348, filed Nov. 30, 1983, abandoned, which is a continuation of Ser. No. 289,893, filed Aug. 4, 1981 abandoned, which is a continuation-in-part of Ser. No. 171,327, filed July 20, 1980, now U.S. Pat. No. 4,526,830.

FIELD OF THE INVENTION

This invention relates to coated fiberglass fabrics which are bacteriostatic, impermeable to liquids such as urine, resistant to chemical attack, and, in addition, are flame retardant. The coated fiberglass fabrics of the present invention are also durable and easy to care for.

BACKGROUND OF THE INVENTION

Flame retardant fabrics are desirable for use in the manufacture of furniture upholstery, curtains, mattress tickings, bedspreads and the like for domestic use as well as for use in institutions, hotels or other commercial establishments, where the safety element associated with such fabrics is desirable. In some states the use flame retardant bedding upholstery in institutions such as hospitals, nursing homes, mental institutions, prisons, universities and the like, is required by law.

Flame retardance has been achieved in heavy cotton fabrics such as A.C.A. striped mattress ticking, by treating the cotton fabric with a hydrated sodium borate compound. The sodium borate treatment functions both to reduce the rate of travel of the flame through the fabric, as well as to contribute a self-extinguishing property to the fabric, such that upon removal of the external flame source, the treated fabric itself is substantially incapable of supporting a flame.

In addition to the property of flame retardance, for many applications it is desirable that a fabric be bacteriostatic and/or fungistatic as well as water resistant. Treated fabrics having these combined properties would be extremely well suited for use in the manufacture of mattress tickings for use in institutions such as hospitals or prisons. Of course, a fabric employed as a mattress ticking for institutional use must also be resistant to the extreme wear associated with institutional usage. The A.C.A. striped ticking mentioned above has acceptable wear resistance properties. However, the chemical resistance of this fabric is poor and, therefore, its flame retardance deteriorates as a result of exposure to conventional cleaning processes.

U.S. Pat No. 3,279,986 discloses a coated fabric which has acceptable wear properties, is flame retardant, and is also resistant to chemical attack. The fabric disclosed by this reference comprises a nylon scrim coated or laminated on both sides with a flexible sheet of polyvinyl chloride which incorporates about 0.10 to 0.60% of a bis-(tri-n-alkyltin) sulfosalisylate bactericidal compound. However, due to the relatively large amount of polyvinyl chloride employed by the polymeric vinyl layers of this product, when exposed to a direct flame the vinyl layer chars and releases relatively large amounts of toxic fumes.

Fiberglass fabrics and wools have been employed in the manufacture of fireproof mattress pads. See, U.S. Pat. Nos. 2,632,187 and 2,801,427.

U.S. Pat. No. 2,801,427 (hereinafter '427) discloses a fireproof bed pad or mattress cover comprised of an inner layer of aluminum foil sandwiched between two insulating layers formed from a mineral wool of fiberglass. The outermost surface layer of the mattress pad described by this reference is comprised of a waterproof cloth.

U.S. Pat. No. 2,632,187 (hereinafter '187) discloses a fire resistant and water repellant mattress pad comprised of a thick inner fiberglass batting layer contained between a facing or upper layer of fiberglass cloth, and a backing layer of cotton fabric.

Although the fiberglass layers of the mattress pads disclosed by the '427 and '187 patents are flame retardant and flame resistant, the outer cloth layers of the mattress pads disclosed by these references provide a potential source of flammable material which could be hazardous in the event of fire.

Woven or matted fiberglass coated with lacquer coating compositions have also been employed in the manufacture of window shades which are resistant to deterioration by sunlight, water, heat and cold. See U.S. Pat. No. 2,381,542 (hereinafter '542). The fiberglass coatings disclosed by the '542 patent are prepared from cellulose derivative fiber formers and do not include fire retardants, fungicides or bacteriocides.

In addition to fiberglass coated window shades, it is also known to coat thin fiberglass sheets with polyester. The coated fiberglass sheets are bonded as a laiminate to printed circuit sheets formed from copper.

It is also known to coat burlap fabrics suitable for use as wall coverings with flame retardant coating compositions. In particular, burlap fabrics have been coated with a fire retardant plasticized polyvinyl chloride based coating composition containing antimony pentaoxide.

Although the prior art discloses coated fabrics, the prior art does not provide a chemically coated fiberglass fabric which is flame retardant, fungistatic, bacteriostatic, impermeable to liquids such as water or urine, resistant to chemical attack, and which does not release dangerous amounts of toxic fumes when it burns.

Accordingly, it is an object of the present invention to provide a coated fiberglass fabric which possesses each of the properties listed above.

It is also an object of the present invention to provide a fiberglass based mattress ticking or cover possessing each of the properties listed above, and which is particularly well suited for use on mattresses employed in institutions such as hospitals or prisons or for commercial use in hotels, or in other settings where extreme usage conditions prevail.

BRIEF DESCRIPTION OF THE INVENTION

The present invention provides a coated fabric which is suitable for use in the manufacture of articles of manufacture such as furniture upholstery, drapery, mattress pads, mattress covers, mattress ticking, garments, tents, pillow covers, wall coverings and the like comprising a woven or non-woven fiberglass fabric, a coating layer of a polymer based coating composition; said coating composition comprising a plasticizer, an effective amount of a flame retardant, and when bacteriocidal and/or fungicidal properties are desired in the fabric, an effective amount of fungicide and/or bacteriocide, wherein the amount of said coating composition comprising said coating layer is adapted to render said fiberglass fabric non-abrasive.

DETAILED DESCRIPTION OF THE INVENTION

The chemically coated fabric of this invention comprises a woven or non-woven fiberglass fabric base to which one or more thin layers of a polymeric coating have been applied. The fiberglass fabric base is inherently fire retardant. In addition, the coated fabric is flame retardant, impermeable to liquids such as urine, and when a bacteriocide and/or fungicide is employed, the fabric will not support fungus or bacteria growth. The coating layer is also chemically resistant and, hence, the coating does not deteriorate as a result of exposure to conventional cleaning processes.

The fabric base may comprise any conventional woven or non-woven fiberglass fabric. However, the particular fiberglass fabric selected will depend upon the end-use intended for the coated fiberglass fabric product. For example, for the preparation of the mattress ticking of this invention, a fiberglass fabric having a tensile strength in the range of from about 75 to 150 lbs./square inch up to 292 lbs./square inch is employed.

A particularly suitable fiberglass fabric for use this invention has a tensile strength of about 250 lbs./square inch. Fiberglass fabrics having tensile strengths in the ranges indicated exhibit the degree of elasticity and resistance to tear considered desirable for commercial mattress tickings.

A particularly suitable fiberglass fabric for use in the manufacture of mattress tickings is a fiberglass fabric which is woven in a Jacquard weave. It has been found that the Jacquard weave functions to enhance the strength of fiberglass fabrics. The fiberglass yarn from which the Jacquard fabric may be woven is a single ply C-fiber yarn which is one turn out-of-twist and has a Denier of 75. During the weaving process one 42 inch warp is wound around four beams of 2×523 and 2×524 ends, and a 12-harness weave is employed to provide the Jacquard pattern. The fabric has a weight of about 8.71 ounces per yard, and about 1.56 yards per pound. Fiberglass fabrics of this type are commercially available from the Clark-Schwebel Fiber Glass Corporation of White Plains, N.Y. under the style designation number 487/2/42.

In general, suitable fiberglass fabrics may be comprised of C, D, E or D/E glass fibers and may have a fabric thickness of from about 1.3 to about 46 mils., preferably 10 mils.; a fabric weight of about 1.5 to about 25, and preferably about 6.9 to 12.5 ounces per square yard. The glass filaments have a nominal diameter of about 0.00018–0.00025; and the yarn Denier is about 100–1200, e.g. the yarn Denier may be 100, 300, 600, 900 or 1200. Tensile strengths in the warp may range from about 45 to about 1,658 lbs. per square inch and in the fill from about 32 to about 1,371 lbs. per square inch. The individual strands may be comprised of about 408–1,632 filaments per strand, e.g. 816 filaments per strand for a C-yarn 300 Denier; 1,632 filaments per strand for a C-yarn 600 Denier; 408 filaments per strand for a D/E yarn of 300 Denier; 816 filaments per strand for a yarn of 600 Denier; and 1,632 filaments per strand for a D/E yarn of 1200 Denier. The fabric may be woven, unwoven or knitted and conventional weave patterns such as the Jacquard, Darby, 12-Harness satin, or Tafetta weaves (e.g. 1×1, 2×2, 2×1, 3×1 or 4×1) may be employed. Filament or texturized fibers may be employed in the warp and/or fill.

The coating layer which is applied to the fabric base comprises a polymeric carrier which contains one or more component ingredients which contribute to the flame retardance of the coating, such as antimony pentaoxide and/or antimony trioxide. The coating formulation may also contain an effective amount of a plasticizer, and a filler as well as one or more bacteriostatic and/or fungistatic agents. Preferably, the filler also functions as a flame retardant.

Suitable polymeric carriers include chlorine containing polymers such as polyvinyl chloride, polyvinyl chloride acetate copolymer, acrylic vinyl chloride latex or ethylene vinylidine chloride polymers. Suitable ethylene vinylidene chloride polymeric carriers are commercially available from the Air Products Corp. under the tradename Air Flex 45-14. Alternatively, the polymeric carrier may be polychloroprene (i.e. neoprene); chlorosulfonated polyethers such as Hypalon ® which is commercially available from Dow Chemical Co., or silicone rubber. The polymeric carrier may also be comprised of a vinyl chloride acrylic copolymer or an acrylic homopolymer or copolymer, or polytetrafluoroethylene. However, the preferred polymeric carrier is an acrylic vinyl chloride latex which is comprised of a carboxylated copolymer of vinyl chloride and a softer acrylate which self cross-links upon curing. Polymers of this type are commercially available from the B. F. Goodrich Co. of Akron, Ohio under the chemical product designation No. 460X2.

Any conventional plasticizer which is compatible with the other components of the coating formulation may be employed. For example, suitable plasticizers include the phosphate plasticizers such as para-tricresyl phosphate or octyldiphenyl phosphate. Para-tricresyl phosphate is a colorless liquid which in addition to functioning as a plasticizer also contributes to the water impermeability and flame retardance of the coating.

The plasticizer may also be comprised of a chlorinated or brominated paraffin compound which in addition to improving the "hand" of the coating, functions to aid in the flame retardant properties of the polymeric carrier. Preferred plasticizers of this type are the chlorinated paraffins having about a 50% chlorine content.

The coating formulation may also include as a filler, an ingredient such as aluminum trihydrate which contributes to the flame retardance of the coating. When exposed to heat, aluminum trihydrate releases water vapor and, hence, functions as a flame retardant.

The primary fire retardant component employed in the coating is antimony trioxide and/or antimony pentaoxide. These compounds impart fire retardant properties to the coating when employed in combination with the chlorine or bromine containing compounds of the coating formulation, in the proportions described.

The antibacterial and/or antifungal properties of the coating are provided by including a bacteriostatic and/or fungistatic agent in the coating formulation. Any conventional bacteriocide and/or fungicide which is compatible with the polymeric carrier and the other components of the formulation may be employed, e.g. bis(tri-n-alkyltin) sulfosalisylates disclosed in U.S. Pat. No. 3,279,986. However, the preferred bacteriocide and fungicide is N-trichloromethylthio-4-cyclohexene-1,2-dicarboximide. The bacteriocidal and fungicidal properties of N-trichloromethylthio-4-cyclohexene-1, 2-dicarboximide may also function to prevent the stiffening of the coating due to plasticizer depletion caused by the activity of bacteria and fungi. This compound is commercially available from R. T. Vanderbuilt, Inc., 20 Winfield Street, Norwalk, Conn., and is marketed under the tradename Vancide ® 89.

In order to function effectivley as a fungicide and in particular to prevent unsightly mildew and bacterial growth, the fungicidal and/or bacteriocidal component must migrate to the surface of the coating layer. The rate of migration of the fungicidal and/or bacteriocidal component is determined by the compatibility of the component in the coating formulation. If this component does not migrate at a proper rate, an effective concentration of the active ingredient will not be present at the surface of the coating layer. On the other hand, if the migration of the fungicide and/or bacteriocide is too rapid, unsightly blooming of the component on the surface of the coating layer will occur. In accordance with the coating formulation of this invention from about 0.5 to 2 parts, and preferably about 1 part of a fungicide and bacteriocide (based on 100 parts of the polymeric carrier) such as N-trichloromethylthio-4-cyclohexene-1,2-dicarboximide is employed. At this concentration level the fungicide and bacteriocide are compatible with the other components of the formulation, and a concentration of the ingredient on the surface of the coating which is effective against fungi and bacteria is provided.

Preferably the coating formulation contains, based on 100 parts of the polymeric carrier, from about 25 to 75 parts of the filler (e.g. aluminum trihydrate), from about 5 to 25 parts of the plasticizer, from about 3 to 10 parts of antimony trioxide or antimony pentaoxide, and from about 0.5 to 2 parts of the bacteriocidal and/or fungicidal agent. Preferably, the polymeric carrier is an acrylic vinylchloride latex, the filler is aluminum trihydrate, the plasticizer is a chlorinated paraffin having about a 50% chlorine content, and the bacteriocide and fungicide is N-trichloromethylthio-4-cyclohexene-1,2-dicarboximide. For example, the coating formulation may comprise on a dry-weight basis about 140 parts acrylic vinyl chlorine latex, about 56 parts aluminum trihydrate, about 6 parts antimony pentaoxide, about 30 parts of a chlorinated paraffin (50% chlorine) and about 1.7 parts of N-trichloromethylthio-4-cyclohexene-1,2-dicarboximide.

The coating formulation is prepared by first mixing together the polymeric carrier, antimony pentaoxide and aluminum trihydrate in the form of about 50% dispersions of each of the components in water. Although aqueous solvent systems are preferred since they do not present the environmental hazards associated with more volatile solvent systems, other compatible solvents systems may be employed. Moreover, plastisoles of polyvinyl chloride or vinyl chloride acetate may be employed.

Preferably, before being dispersed in water, the aluminum trihydrate is ground in a mill until the average particle size of the aluminum trihydrate is less than about 10 microns. The aluminum trihydrate is then dispersed in water in the presence of about 1% by weight (based on the dry weight of the aluminum trihydrate) of a dispersing agent. Suitable dispersing agents include the nonionic dispersing agents, or trisodium phosphate or any other compatible dispersing agent.

The plasticizer and bacteriocide and/or fungicide are then added to the aqueous dispersion of the polymeric carrier, fire retardant and aluminum trihydrate. Prior to coating the formulation onto the fabric base, the viscosity of the formulation is adjusted through the addition of a suitable thickener. The viscosity to which the formulation is adjusted will be determined by the particular coating method employed. Suitable thickeners include methylcellulose, high molecular weight acrylic acids, or preferably a nonionic thickener such as Caropol ® which is commercially available from the Union Carbide Corporation.

After the viscosity of the formulation has been adjusted, the pH of the formulation is adjusted to below about 7.0, and preferably within the range of from about 5.5 to 6.5 with acid or base as required. Preferably the acid employed for pH adjustment is acetic acid and the preferred base is ammonia.

Any conventional coating process may be employed to apply the coating formulation onto the fabric base. For example, a floating knife process, a knife over-roll process, or a reverse-roll coating process may be employed. For use in a floating knife coating process, the viscosity of the formulation should be adjusted through the addition of a thickener to from about 4,000 to 16,000 centipoises, and preferably about 16,000 centipoises. When a knife over-roll coating process is employed, the viscosity of the formulation is preferably adjusted to from about 50,000 to 60,000 centipoises. For use in a reverseroll coating process the viscosity of the formulation is preferably adjusted to from about 4,000 to 5,000 centipoises. The preferred coating process for use in applying the coating formulation to the fiberglass fabric base is the floating knife process, wherein the viscosity of the coating formulation is adjusted to about 16,000 centipoises through the addition of about 1.6 parts of the thickener (on a dry weight basis) to the coating formulation.

Upon application to the fabric base, the coatings are cured by passing the coated fabric through an oven at a temperature of about 325° F.

The coating may be applied in one or more coating passes and may comprise from about 0.25 to about 6 or more ounces per square yard of the fabric base. For a fabric woven from a single ply C-fiber yarn, having a fabric weight of about 6.5 to about 12.0 ounces per yard, preferably about 7.28 to about 11.6 ounces per square yard, and a tensile strength of about 75 to 150 lbs. per square inch, the coating layer may comprise about 0.5 to about 1.75 ounces per square yard. The coating layer may be applied to one or both surfaces of the fabric base.

The coating layer adheres well to the fiberglass fabric base and does not require auxiliary adhesion promoters. However, adhesion promoters may be included in the coating formulation, and their use may be desired where particularly adhesion resistant fiberglass fabrics are utilized. Useful adhesion promoters include N-($\beta$-aminoethyl-$\gamma$-aminopropyl)trimethoxy silane. Adhesion promoters of this type are commercially available from the Union Carbide Corp. under the product designation A1120.

When the polymeric carrier of the coating composition is a latex type carrier, such as the acrylic vinyl chloride latex carrier discussed above, the surface texture of the cured fabric coating may be tacky or sticky. The surface of the cured fabric coating is finished by applying additional coating layers of a polymeric material to the cured coating layer. The outer coating layer provides a smooth, and abrasion resistant surface on the fabric surface. For example, a thin finishing layer of a vinyl chloride acrylic compound may be applied to the fabric by any of the coating processes discussed above.

In order to insure the presence of an effective amount of the fungicide and/or bacteriocide on the surface of the fabric coating, an effective amount of a fungicide and/or bacteriocide may also be included in the composition employed as the surface coating layer. For example, about 1 part by weight of N-trichloromethyl-4-cyclohexene-1,2-dicarboximide may be included in the formulation employed as the surface coating layer.

The surface coating layer is preferably employed in an amount of from about 0.1 to about 0.5 ounces per square yard of fabric. However, the amount of material coated onto the first cured coating layer will depend to a great extent upon the particular coating material employed, and the surface textures desired. Preferably, however, the coating material employed is a vinyl chloride acrylic polymer which is coated onto the first fabric coating layer in an amount of about 0.25 ounces per square yard. Moreover, the total weight of the first and second coating layers preferably should not exceed about 6 ounces per square yard of the fabric base. Vinyl chloride acrylic compounds suitable for use as the surface coating layer are commercially available from the B.F. Goodrich Company, under the chemical product designation number 460X1.

Untreated woven and unwoven fiberglass fabrics possess an abrasive and course texture. Thus, untreated glass fabrics are irritants, greatly reducing the utility of such fabrics in areas where skin contact would be involved during use. The coated fiberglass fabrics of this invention have a smooth, nonabrasive and abrasion resistant surface. The coating layer binds the glass fibers and eliminates the danger of fraying or break-off of bits of the glass fibers, which in the past has rendered fiberglass fabrics unsuitable for applications where skin contact would be involved.

The fiberglass fabric base employed herein may be woven, unwoven or knitted and may be comprised of C, D, E or D/E and preferably C-fiber yarns (i.e. Betacare, OCF Corp.). The coated fabrics of this invention may be employed in the manufacture of a wide variety of articles including flame retardant apparel. For example, an entire flame retardant suit may be manufactured from the coated fiberglass fabric of this invention. This flame retartant suit may comprise a shirt, gloves, shoes and helmet. This suit may be worn as an outer garment or over conventional cloth clothing, or if desired a cloth backing may be secured to the surface of the fiberglass suit which contacts the skin of the wearer.

The fiberglass fabric of this invention may also be employed in the manufacture of flame retardant upholstery, coverings, slipcovers or the like for cushioned articles such as car seats, airplane seats, couches, or other coverings where a fire protective surface or fabric layer might be desirable. For example, a conventional cushion unit such as a foam rubber or polyurethane foam cushion, which itself may or may not possess flame retardant properties, may be upholstered, sheathed or covered in the flame retardant fiberglass fabric described herein.

An entire bedding unit may be manufactured from the coated fiberglass fabric of this invention. In addition to the utility of non-abrasive fiberglass fabric as mattress ticking, this fabric may be employed as the fabric portion of a conventional box spring unit, pillow covers, mattress covers, mattress pads bedspreads, etc.

Where bacteriocidal and/or fungicidal properties are desired in addition to flame retardant properties, for example, where the article will be employed in institutions such as hospitals, prisons or the like, a fungicide and/or bacteriocide is included in the basic polymer based coating composition. Moreover, liquid impermeability properties are imparted to the fabric by applying the coating layer in an amount sufficient to seal the surface pores in the fabric base.

The fiberglass fabric of this invention may also be employed as curtains, for example, as shower curtains or as flame retardant room dividers or cubicle curtains in hospitals or other institutions, or as welding curtains.

Moreover, the coated fiberglass fabrics of this invention may be employed as wall coverings. For this purpose a suitable design may be applied in a conventional manner to the surface of the fabric.

In addition, the water impermeable fabrics of this invention may be employed as tent fabrics, or as tarpaulins or covers for flammable materials. A light weight fire blanket may also be prepared from the fabric of this invention.

The invention will be described further with reference to the following detailed Examples.

EXAMPLE 1

A coating formulation was prepared containing on a dry-weight basis:

| | Parts |
| --- | --- |
| Acrylic Vinyl Chloride Latex (460X2 - B. F. Goodrich Co.) | 140 |
| Aluminum Trihydrate | 56 |
| Antimony pentaoxide | 6 |
| Chlorinated Paraffin Plasticizer (50% Chlorine) | 30 |
| Vancide 89 (N—trichloromethylthio-4-cyclohexene-1,2-dicarboximide) | 1.7 |

The formulation is prepared by mixing together a 50% aqueous dispersion of the acrylic vinyl chloride latex and a 50% aqueous dispersion of the antimony oxide. Prior to adding the aluminum trihydrate, the compound is ground in a mill until the average particle size is about 5 microns. A 50% aqueous dispersion of the milled aluminum trihydrate is prepared by dispersing the compound in water in the presence of about 1% by weight of trisodium phosphate. The aqueous dispersion of the aluminum trihydrate is then added to the aqueous dispersion of the polymer and the antimony oxide. Thirty parts of a chlorinated paraffin (60% chlorine content) plasticizer, and 1.7 parts of N-trichloromethylthio-4-cyclohexene-1,2-dicarboximide are then added to the aqueous dispersion of the other ingredients, and the formulation is mixed in a high speed mixer until uniform.

The viscosity of the formulation is adjusted to about 16,000 centipoises through the addition of about 1.6 parts by weight of Carbopol ®. The pH of the formulation is then adjusted to preferably within the range of from about 5 to 6.5 through the addition of acetic acid.

The coating formulation is applied to a fiberglass fabric base by a floating knife coating process. The fabric base is a Clark-Schwebel Fiber Glass Corp. (Style No. 487/2/42) fiberglass fabric which is woven in a Jacquard weave. The fabric is woven from a C-fiber which is one turn out-of-twist and has a Denier of about 75. The coating layer is applied to both sides of the fabric in one or several passes in a weight of about 3 ounces per square yard of fabric, and the coating is cured by passing it through an oven at a temperature of about 325° F.

A surface coating formulation is prepared by adding 1.7 parts of N-trichloromethylthio-4-cyclohexene-1,2-dicarboximide to a 50% aqueous dispersion of 140 parts of a vinyl chloride acrylic polymer (B.F. Goodrich 460X1). The mixture is then thoroughly blended, and the viscosity is adjusted to about 16,000 centipoises through the addition of Carbopole ®. The pH is adjusted with acid to about 6.5.

The surface coating formulation is applied to the cured coated fabric described above. About 0.25 ounces of the surface coating is applied per yard of fabric treated. The coating is cured by passing it through an oven at about 325° F.

The coated fiberglass fabric has a non-abrasive and abrasion resistant surface. Moreover, the coated fabric prepared in accordance with this example is flame retardant, and is also resistant to convention chemical cleaning agents. Due to the inclusion of an effective amount of a bacteriocide and fungicide in the coating layers, the fabric product will not support fungi growth and is resistant to both gram negative and gram positive bacteria. Thus, the fabric if free of the odors associated with the presence of bacteria or fungi. Moreover, the coating layers render the fabric entirely impermeable to liquids.

EXAMPLE 2

A mattress is prepared from the coated fabric product of Example 1, by sewing the fabric about a conventional mattress unit. The mattress unit may comprise a box spring mattress unit, an inner spring unit, or foam rubber cushion. Sewn seams in untreated fiberglass fabrics tend to separate and are subject to seam slippage. However, the coated fiberglass fabric described herein produces sturdy seams which do not slip, even when subjected to tension such as that to which mattress tickings are subjected during use.

The mattress employing the mattress ticking of this invention has a smooth, non-abrasive surface, not generally associated with fiberglass fabrics. The coated fiberglass ticking is also hypo-allergenic. The durability and other properties which inhere in the coated fabric of this invention render mattress tickings, and mattresses employing them ideally suited for use in institutions or in other settings where extreme usage conditions prevail.

In order to evaluate its flame retardant property, a mattress employing the mattress ticking of Example 1 was wrapped around an inner core of newspapers and drenched in gasoline. The newspapers were ignited in order to evaluate the flame retardant property of the mattress. After the fire was naturally exhausted due to consumption of the newspaper filler, the mattress was unwrapped, and the surface of the mattress ticking was examined. The mattress ticking was entirely free of char, and only a very slight discoloration was noted on the ticking surface.

While specific embodiments of the coated fiberglass fabric of this invention have been described with particularity herein, it should be understood that this invention is intended to cover all changes and modifications of the embodiments of the invention chosen herein for purposes of illustration, which do not constitute departures from the spirit and scope of the present invention.

We claim:

1. A drapable fabric article such as a mattress ticking or cover, bedspread, upholstery, drapery or the like comprising a tightly woven fiberglass fabric having on at least one surface thereof an unfoamed coating of a flame retardant and plasticized polymeric coating composition, said coating having been formed by applying up to about three ounces per square yard of said coating composition directly to and over the entirety of at least one surface of the fiberglass fabric, wherein the article is coated on at least one outermost surface by an amount of polymeric coating agent sufficient to render the fabric non-abrasive and abrasion resistant.

2. The fabric article according to claim 1 wherein the fabric article is sewable.

3. The fabric article according to claim 1 wherein the article forms a mattress ticking or cover.

4. The fabric article according to claim 1 wherein the flame retardant and plasticized polymeric coating composition comprises an effective amount of a bactericide.

5. The fabric article according to claim 4 wherein the bactericide is N-trichloromethylthio-4-cyclohexene-1,2-dicarboximide.

6. The fabric article according to claim 1 wherein the coating comprises antimony pentaoxide, antimony trioxide or a mixture of both.

7. A drapable flame retardant mattress ticking comprising a single base layer of a tightly woven fiberglass fabric having on at least one surface thereof an unfoamed coating of a flame retardant and plasticized coating composition comprising acrylic vinyl chloride latex or polychloroprene, said coating having been formed by applying up to about three ounces per square yard of said coating composition directly to and over the entirety of at least one surface of the fiberglass fabric base; wherein the ticking is coated on at least one outermost surface by an amount of vinyl chloride acrylic polymer sufficient to render the surface non-abrasive and abrasion resistant.

8. The mattress ticking according to claim 7 wherein the ticking is sewable.

9. The mattress ticking according to claim 7 wherein the flame retardant coating composition comprises an effective amount of a bactericide.

10. The mattress tickng according to claim 9 wherein the bactericide is N-trichloromethylthio-4-cyclohexene-1,2-dicarboximide.

11. The mattress ticking according to claim 7 wherein the flame retardant is antimony pentoxide, antimony trioxide of a mixture of both.

12. The mattress ticking accordng to claim 7 wherein the coating composition is comprised of acrylic vinyl chloride latex.

13. The mattress ticking according to claim 7 wherein the coating composition is comprised of polychloroprene.

14. A flame retardant mattress comprising an inner mattress unit and an outer ticking wherein said ticking is comprised of a drapable fabric comprising a tightly woven fiberglass fabric having on at least one surface thereof an unfoamed coating of a flame retardant and plasticized polymeric coating composition, said coating having been formed by applying up to about three ounces per square yard of said coating composition directly to and over the entirety of at least one surface of the fiberglass fabric, wherein the ticking is coated on at least one outermost surface by an amount of polymeric coating agent sufficient to render the fabric non-abrasive and abrasion resistant.

15. The flame retardant mattress according to claim 14 wherein the flame retardant and plasticized polymeric coating composition comprises an effective amount of a bactericide.

16. The flame retardant mattress according to claim 15 wherein the bactericide is N-trichloromethylthio-4-cyclohexene-1, 2-dicarboximide.

17. The flame retardant mattress according to claim 14 wherein the flame retardant is antimony pentaoxide, antimony trioxide or a mixture of both.

18. The flame retardant mattress according to claim 14 wherein the ticking is sewable.

19. The flame retardant mattress according to claim 14 wherein the flame retardant coating composition is comprised of acrylic vinyl chloride latex.

20. The flame retardant mattress according to claim 14 wherein the flame retardant coating composition is comprised of polychloroprene.

* * * * *